(12) United States Patent
Gupta et al.

(10) Patent No.: US 12,675,081 B2
(45) Date of Patent: Jul. 7, 2026

(54) SYSTEMS AND METHODS FOR EXPLAINING OPERATIONAL CHANGES IN TERMS OF DESIGN VARIABLES IN CONTROL CODE FOR CYBER-PHYSICAL SYSTEMS

(71) Applicants: Sandeep Gupta, Phoenix, AZ (US); Ayan Banerjee, Gilbert, AZ (US); Imane Lamrani, Phoenix, AZ (US)

(72) Inventors: Sandeep Gupta, Phoenix, AZ (US); Ayan Banerjee, Gilbert, AZ (US); Imane Lamrani, Phoenix, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 842 days.

(21) Appl. No.: 17/813,564

(22) Filed: Jul. 19, 2022

(65) Prior Publication Data

US 2023/0026668 A1     Jan. 26, 2023

Related U.S. Application Data

(60) Provisional application No. 63/223,360, filed on Jul. 19, 2021.

(51) Int. Cl.
G05B 9/02 (2006.01)
(52) U.S. Cl.
CPC ..................................... G05B 9/02 (2013.01)
(58) Field of Classification Search
CPC ....................................................... G05B 9/02
See application file for complete search history.

(56) References Cited

U.S. PATENT DOCUMENTS

| | | | | |
|---|---|---|---|---|
| 7,774,191 B2 * | 8/2010 | Berkowitz | ............. | G06Q 40/06 |
| | | | | 703/23 |
| 2012/0277949 A1 * | 11/2012 | Ghimire | ............. | G05B 23/0275 |
| | | | | 701/31.7 |
| 2021/0209505 A1 * | 7/2021 | Crabtree | ................ | G06Q 10/04 |

OTHER PUBLICATIONS

Ringle, NTSB report; Uber software had flaws, driver inattentive prior to fatal Tempe crash in 2018, Business Journal (Phoenix) 2019 WLNR 33548272. Nov. 6, 2019. 3 pages.
Bendersky, https://gibhub.com/eliben/pycparser. 2020. 6 pages.
(Continued)

*Primary Examiner* — Bryce P Bonzo
*Assistant Examiner* — Audrey Emma Whitesell
(74) *Attorney, Agent, or Firm* — Polsinelli PC

(57) ABSTRACT

Complexities arising from interaction between multiple inter-connected components in an autonomous cyber physical system can potentially result in differences in intended and observed operations of a CPS. To perform fault analysis of a CPS it is imperative to explain this discrepancy in terms of the components of CPS control code. A system estimates a "mined" hybrid system representation of a CPS based on observed input/output traces and extracts a state machine representation of the CPS control code. The system compares the "mined" hybrid system representation with the extracted state machine representation simplification of the CPS code to identify discrepancies between expected and observed operation of the CPS. The system explains discrepancies in terms of call conditions as binary or unary operations on input and output variables and status of function call arguments.

25 Claims, 13 Drawing Sheets
(7 of 13 Drawing Sheet(s) Filed in Color)

(56) References Cited

OTHER PUBLICATIONS

H. Balakrishnan, I. Hwang, J. S. Jang, and C. J. Tomlin, "Inference methods for autonomous stochastic linear hybrid systems," in International Workshop on Hybrid Systems: Computation and Control. Springer, 2004, pp. 64-79.

L. Blackmore, S. Gil, S. Chung, and B. Williams, "Model learning for switching linear systems with autonomous mode transitions," in 2007 46th IEEE Conference on Decision and Control. IEEE, 2007, pp. 4648-4655.

B. Hoxha, A. Dokhanchi, and G. Fainekos, "Mining parametric temporal logic properties in model-based design for cyber-physical systems," International Journal on Software Tools for Technology Transfer, vol. 20, No. 1, pp. 79-93, 2018.

X. Jin, A. Donze, J. V. Deshmukh, and S. A. Seshia, "Mining requirements from closed-loop control models," IEEE Transactions on Computer-Aided Design of Integrated Circuits and Systems, vol. 34, No. 11, pp. 1704-1717, 2015.

I. Lamrani, A. Banerjee, and S. K. S. Gupta, "Hymn: Mining linear hybrid automata from input output traces of cyber-physical sys-tems," in 2018 IEEE Industrial Cyber-Physical Systems (ICPS), May 2018, pp. 264-269.

D. L. Ly and H. Lipson, "Learning symbolic representations of hybrid dynamical systems," Journal of Machine Learning Research, vol. 13, No. Dec, pp. 3585-3618, 2012.

S. Lyde and M. Might, "Extracting hybrid automata from control code," in NASA Formal Methods Symposium. Springer, 2013, pp. 447-452. S. Minopoli and G. Frehse, "SI2sx translator: from simulink to spaceex models," in Proceedings of the 19th International Conference on Hybrid Systems: Computation and Control. ACM, 2016, pp. 93-98.

R. Medhat, S. Ramesh, B. Bonakdarpour, and S. Fischmeister, "A framework for mining hybrid automata from input/output traces," in Proceedings of the 12th International Conference on Embedded Software, ser. EMSOFT '15. Piscataway, NJ, USA: IEEE Press, 2015, pp. 177-186.

Minopoli et al., SL2SX Translator: From Simulink to SpaceEx Models, HSCC '16, Vienna, Austria, Apr. 12-14, 2016.

O. Niggemann, B. Stein, A. Vodencarevic, A. Maier, and H. K. Biining, "Learning behavior models for hybrid timed systems." in AAAI, vol. 2, 2012, pp. 1083-1090.

* cited by examiner

100

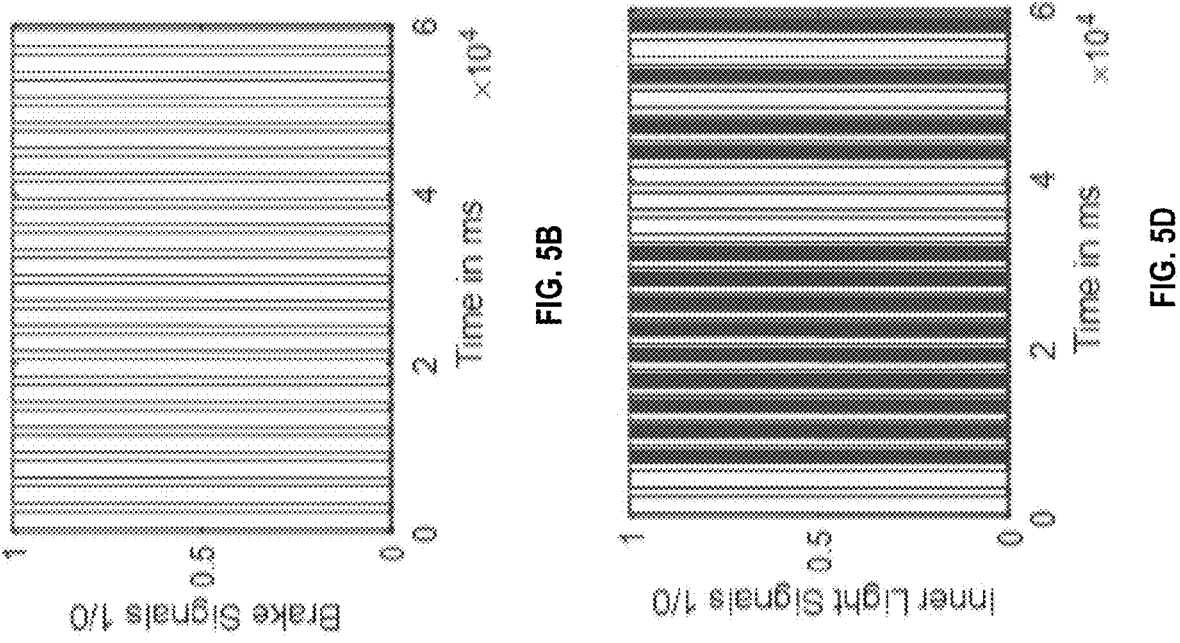
FIG. 5A
FIG. 5B
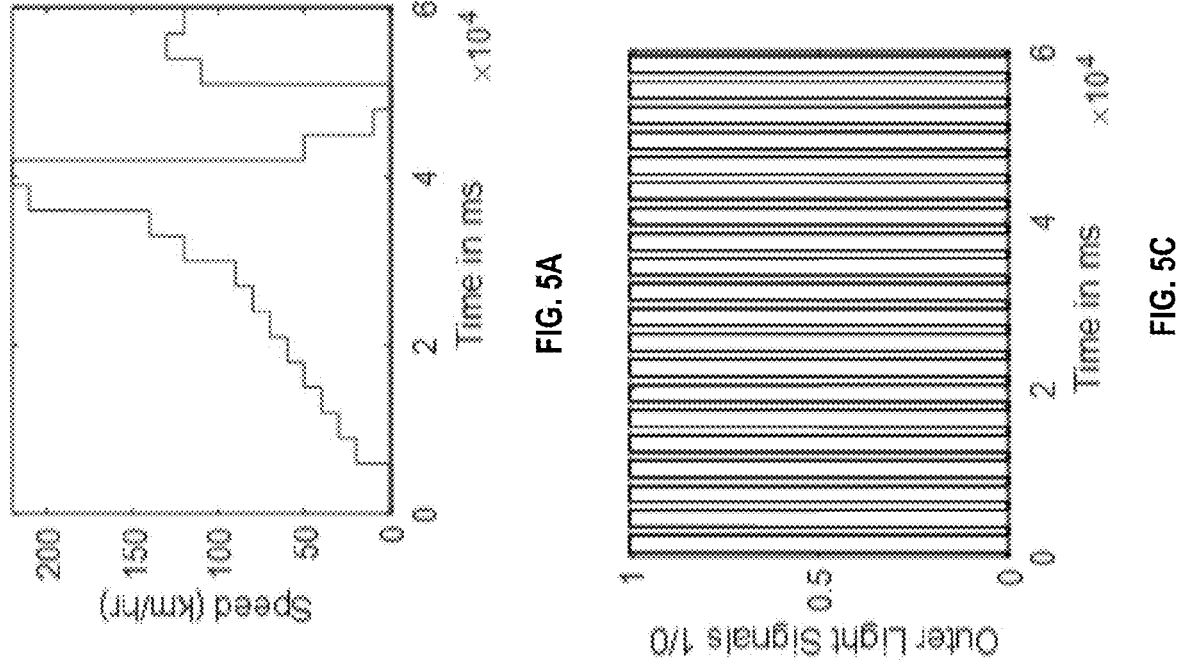
FIG. 5C
FIG. 5D

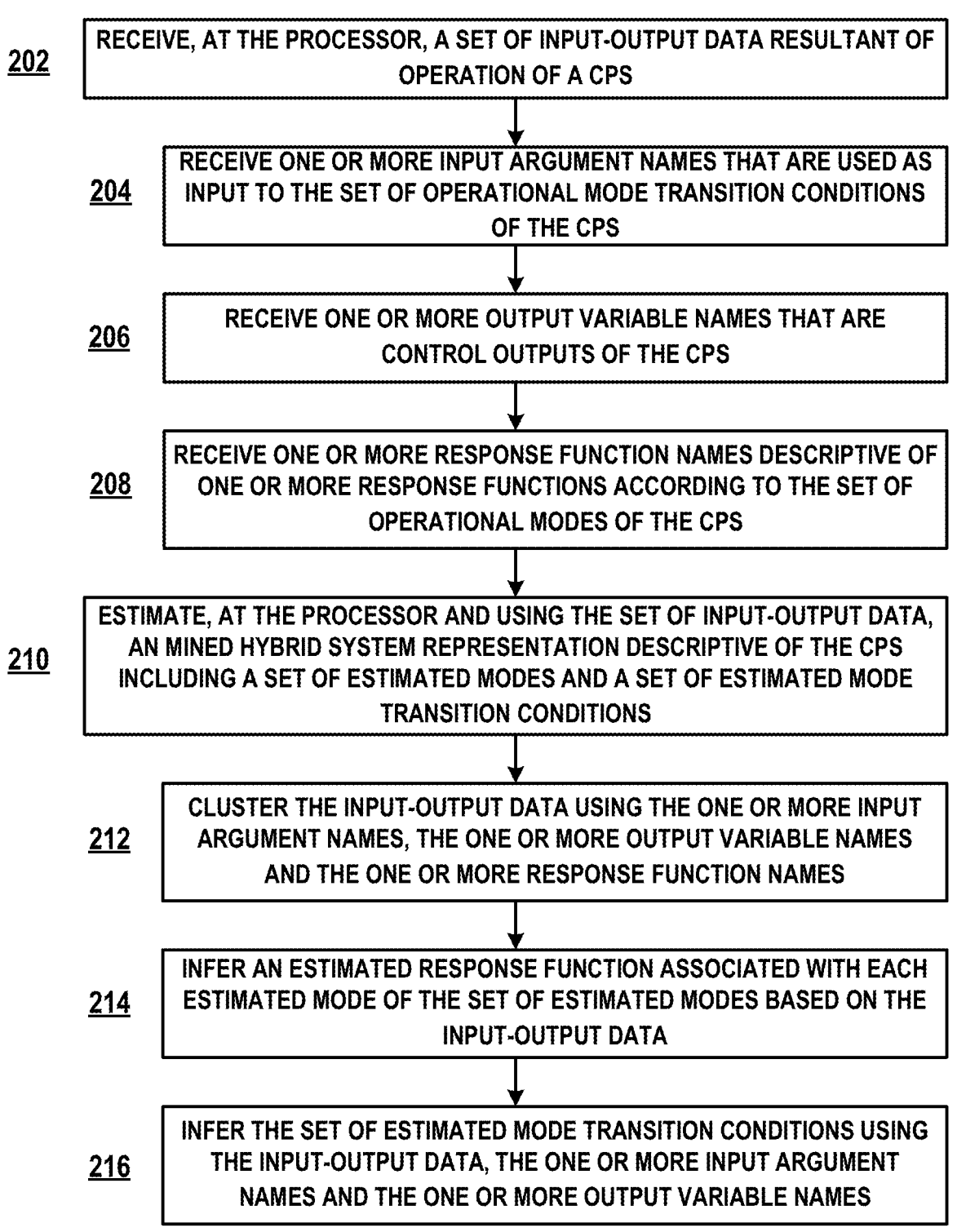

200

202 RECEIVE, AT THE PROCESSOR, A SET OF INPUT-OUTPUT DATA RESULTANT OF OPERATION OF A CPS

204 RECEIVE ONE OR MORE INPUT ARGUMENT NAMES THAT ARE USED AS INPUT TO THE SET OF OPERATIONAL MODE TRANSITION CONDITIONS OF THE CPS

206 RECEIVE ONE OR MORE OUTPUT VARIABLE NAMES THAT ARE CONTROL OUTPUTS OF THE CPS

208 RECEIVE ONE OR MORE RESPONSE FUNCTION NAMES DESCRIPTIVE OF ONE OR MORE RESPONSE FUNCTIONS ACCORDING TO THE SET OF OPERATIONAL MODES OF THE CPS

210 ESTIMATE, AT THE PROCESSOR AND USING THE SET OF INPUT-OUTPUT DATA, AN MINED HYBRID SYSTEM REPRESENTATION DESCRIPTIVE OF THE CPS INCLUDING A SET OF ESTIMATED MODES AND A SET OF ESTIMATED MODE TRANSITION CONDITIONS

212 CLUSTER THE INPUT-OUTPUT DATA USING THE ONE OR MORE INPUT ARGUMENT NAMES, THE ONE OR MORE OUTPUT VARIABLE NAMES AND THE ONE OR MORE RESPONSE FUNCTION NAMES

214 INFER AN ESTIMATED RESPONSE FUNCTION ASSOCIATED WITH EACH ESTIMATED MODE OF THE SET OF ESTIMATED MODES BASED ON THE INPUT-OUTPUT DATA

216 INFER THE SET OF ESTIMATED MODE TRANSITION CONDITIONS USING THE INPUT-OUTPUT DATA, THE ONE OR MORE INPUT ARGUMENT NAMES AND THE ONE OR MORE OUTPUT VARIABLE NAMES

FIG. 10A

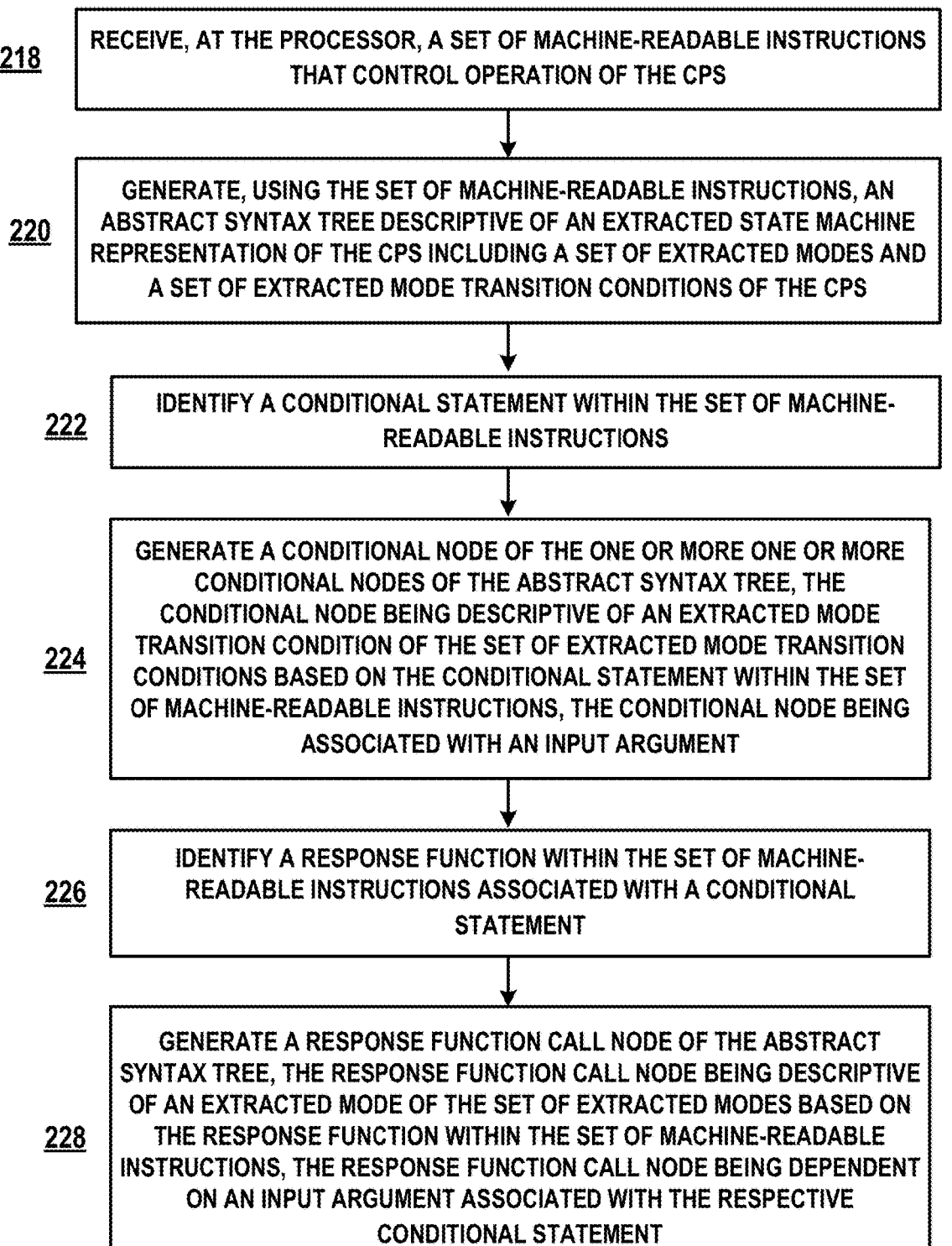

200 (CONT'D)

218　RECEIVE, AT THE PROCESSOR, A SET OF MACHINE-READABLE INSTRUCTIONS THAT CONTROL OPERATION OF THE CPS

220　GENERATE, USING THE SET OF MACHINE-READABLE INSTRUCTIONS, AN ABSTRACT SYNTAX TREE DESCRIPTIVE OF AN EXTRACTED STATE MACHINE REPRESENTATION OF THE CPS INCLUDING A SET OF EXTRACTED MODES AND A SET OF EXTRACTED MODE TRANSITION CONDITIONS OF THE CPS

222　IDENTIFY A CONDITIONAL STATEMENT WITHIN THE SET OF MACHINE-READABLE INSTRUCTIONS

224　GENERATE A CONDITIONAL NODE OF THE ONE OR MORE ONE OR MORE CONDITIONAL NODES OF THE ABSTRACT SYNTAX TREE, THE CONDITIONAL NODE BEING DESCRIPTIVE OF AN EXTRACTED MODE TRANSITION CONDITION OF THE SET OF EXTRACTED MODE TRANSITION CONDITIONS BASED ON THE CONDITIONAL STATEMENT WITHIN THE SET OF MACHINE-READABLE INSTRUCTIONS, THE CONDITIONAL NODE BEING ASSOCIATED WITH AN INPUT ARGUMENT

226　IDENTIFY A RESPONSE FUNCTION WITHIN THE SET OF MACHINE-READABLE INSTRUCTIONS ASSOCIATED WITH A CONDITIONAL STATEMENT

228　GENERATE A RESPONSE FUNCTION CALL NODE OF THE ABSTRACT SYNTAX TREE, THE RESPONSE FUNCTION CALL NODE BEING DESCRIPTIVE OF AN EXTRACTED MODE OF THE SET OF EXTRACTED MODES BASED ON THE RESPONSE FUNCTION WITHIN THE SET OF MACHINE-READABLE INSTRUCTIONS, THE RESPONSE FUNCTION CALL NODE BEING DEPENDENT ON AN INPUT ARGUMENT ASSOCIATED WITH THE RESPECTIVE CONDITIONAL STATEMENT

FIG. 10B

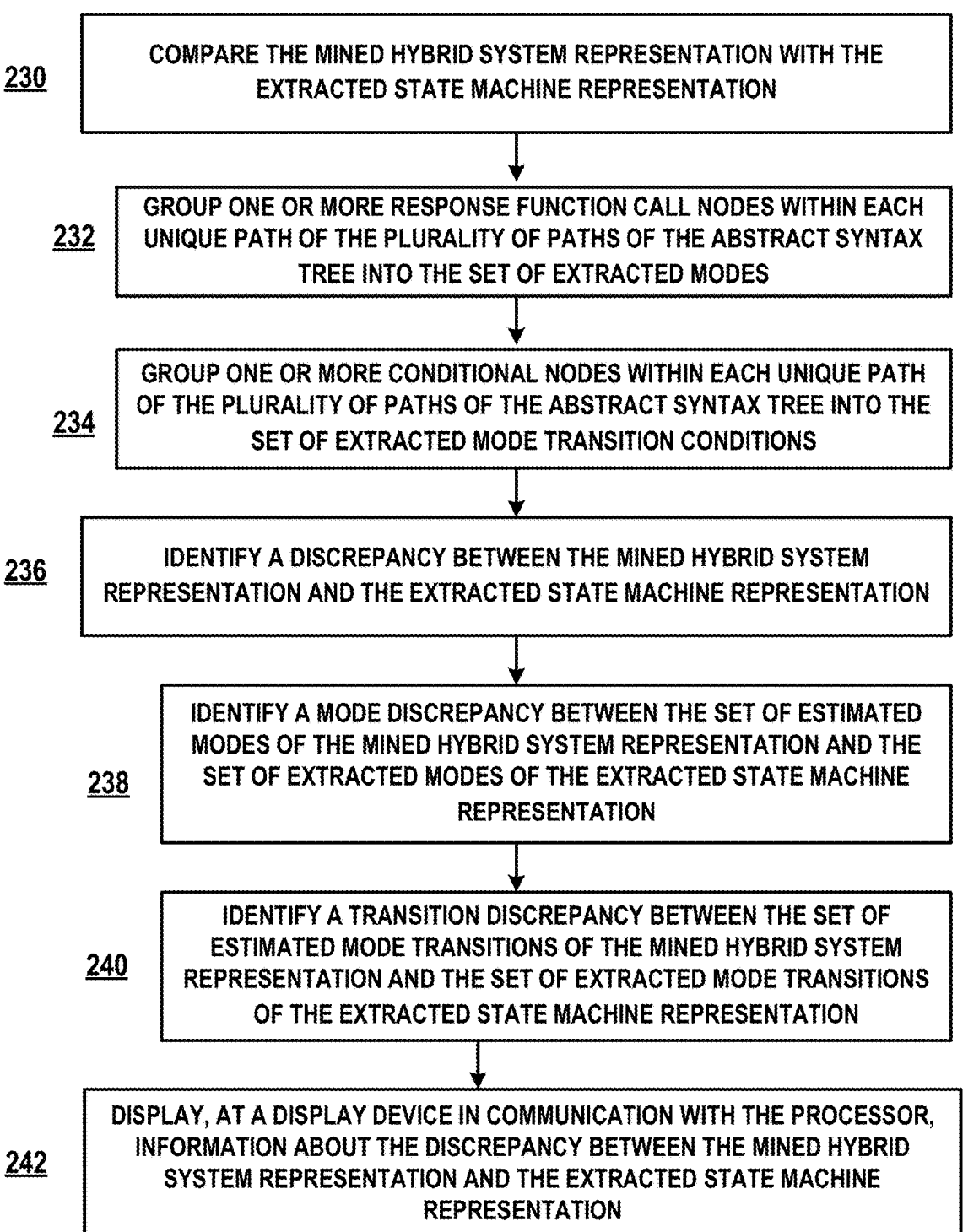

200 (CONT'D)

230　COMPARE THE MINED HYBRID SYSTEM REPRESENTATION WITH THE EXTRACTED STATE MACHINE REPRESENTATION

232　GROUP ONE OR MORE RESPONSE FUNCTION CALL NODES WITHIN EACH UNIQUE PATH OF THE PLURALITY OF PATHS OF THE ABSTRACT SYNTAX TREE INTO THE SET OF EXTRACTED MODES

234　GROUP ONE OR MORE CONDITIONAL NODES WITHIN EACH UNIQUE PATH OF THE PLURALITY OF PATHS OF THE ABSTRACT SYNTAX TREE INTO THE SET OF EXTRACTED MODE TRANSITION CONDITIONS

236　IDENTIFY A DISCREPANCY BETWEEN THE MINED HYBRID SYSTEM REPRESENTATION AND THE EXTRACTED STATE MACHINE REPRESENTATION

238　IDENTIFY A MODE DISCREPANCY BETWEEN THE SET OF ESTIMATED MODES OF THE MINED HYBRID SYSTEM REPRESENTATION AND THE SET OF EXTRACTED MODES OF THE EXTRACTED STATE MACHINE REPRESENTATION

240　IDENTIFY A TRANSITION DISCREPANCY BETWEEN THE SET OF ESTIMATED MODE TRANSITIONS OF THE MINED HYBRID SYSTEM REPRESENTATION AND THE SET OF EXTRACTED MODE TRANSITIONS OF THE EXTRACTED STATE MACHINE REPRESENTATION

242　DISPLAY, AT A DISPLAY DEVICE IN COMMUNICATION WITH THE PROCESSOR, INFORMATION ABOUT THE DISCREPANCY BETWEEN THE MINED HYBRID SYSTEM REPRESENTATION AND THE EXTRACTED STATE MACHINE REPRESENTATION

FIG. 10C

SYSTEMS AND METHODS FOR EXPLAINING OPERATIONAL CHANGES IN TERMS OF DESIGN VARIABLES IN CONTROL CODE FOR CYBER-PHYSICAL SYSTEMS

CROSS-REFERENCE TO RELATED APPLICATIONS

This is a non-provisional application that claims benefit to U.S. Provisional Patent Application Ser. No. 63/223,360 filed 19 Jul. 2021, which is herein incorporated by reference in its entirety.

FIELD

The present disclosure generally relates to cyber-physical systems, and in particular, to a system and associated method for determining a cause of deviation from expected operation of a cyber-physical system.

BACKGROUND

Cyber Physical Systems (CPS) are complex systems with multiple interacting components including the physical environment and human participants. As such, faulty operation of any CPS sub-component can cause serious safety issues. For example, violation of timing constraints in an automated braking system can potentially result in fatal consequences. A faulty operation in CPS can occur due to several reasons: a) difference in safety assured design and implementation, b) presence of vulnerability in CPS code, c) usage of the CPS in an unapproved use case, or d) a fundamentally faulty design. However, the vital task of troubleshooting a CPS model can be difficult and time-consuming.

It is with these observations in mind, among others, that various aspects of the present disclosure were conceived and developed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 5A-5D are a series of graphical representations showing input-output traces of the example heavy vehicle braking system of FIG. 2 for validation of the system of FIG. 1;

Corresponding reference characters indicate corresponding elements among the view of the drawings. The headings used in the figures do not limit the scope of the claims.

DETAILED DESCRIPTION

1. Introduction

Vulnerability in code that controls a cyber-physical system (CPS) can result in two broad types of behavior changes: a) change in actuation conditions, and b) change in actuation input. An actuation condition is expressed as a binary or unary operation on the input and output variables of the CPS control code. An actuation input, on the other hand, is the stimuli generated by the controller to cause a change in the environment. The actuation input causes an external perturbation to the environment triggering a dynamic response.

Code vulnerabilities may be introduced after a safety verified CPS code has been deployed. In another scenario, it can also be a result of a hardware artifact such as difference in architectures, malfunction, or noise. In such cases, the high-level code may not be incorrect but the binary code that runs in the hardware architecture may have an optimization that results in a different behavior. Such changes in behavior hence cannot be identified by traditional software analysis techniques such as static or dynamic analysis. A possible way of detecting such changes in operational behavior is to analyze the input/output responses of the CPS in real life deployment.

Figure 1:
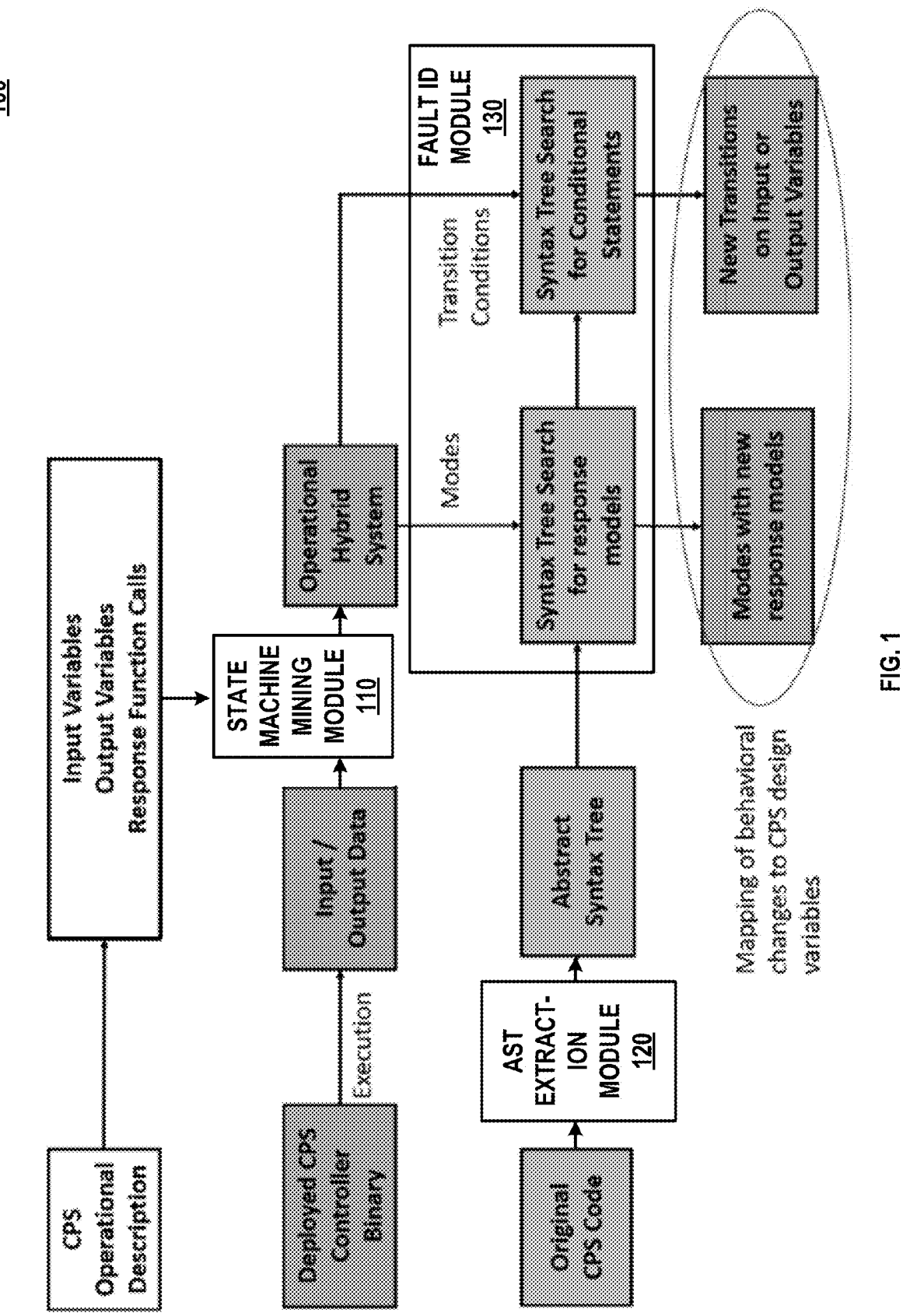
FIG. 1 is a simplified block diagram showing a system for detecting faults (e.g., deviations from expected operation) in a CPS.

With reference to FIG. 1, the present disclosure provides a system 100 that implements a data driven model extraction and validation framework for identifying deviation between intended or expected operation of control code of a CPS and observed behavior of the CPS during deployment. The system 100 expresses observed input/output behavior of a CPS using a CPS model extraction methodology, such as HyMN model extraction algorithm to generate a "mined" hybrid system representation of the CPS, which can include estimated modes and estimated transition conditions. The mined hybrid system representation is indicative of actual behavior of the CPS. The system 100 further characterizes expected operation of the CPS as an abstract syntax tree (AST) based on original CPS control code; the system extracts extracted modes and extracted transition conditions of the hybrid system from unique function call paths and represents the modes and transition conditions within the AST. Transitions between the modes can be expressed as binary or unary operations on the input/output variables in the safety assured CPS code. The AST yields an extracted state machine representation of the CPS. The system 100 then compares the estimated modes and the estimated transition conditions derived within the mined hybrid system representation with extracted modes and extracted transition conditions of the extracted state machine representation obtained from the AST of the CPS control code. As such, the system 100 compares the mined hybrid system representation (e.g., a representation of observed behavior of the CPS) with the extracted state machine representation (e.g., a representation of the expected behavior of the CPS) to identify discrepancies. The system 100 identifies discrepancies in terms of new CPS modes if a control response has changed or in terms of new conditions on input/output variables if control conditions have changed, and can display information about the discrepancies to a user.

Figure 2:
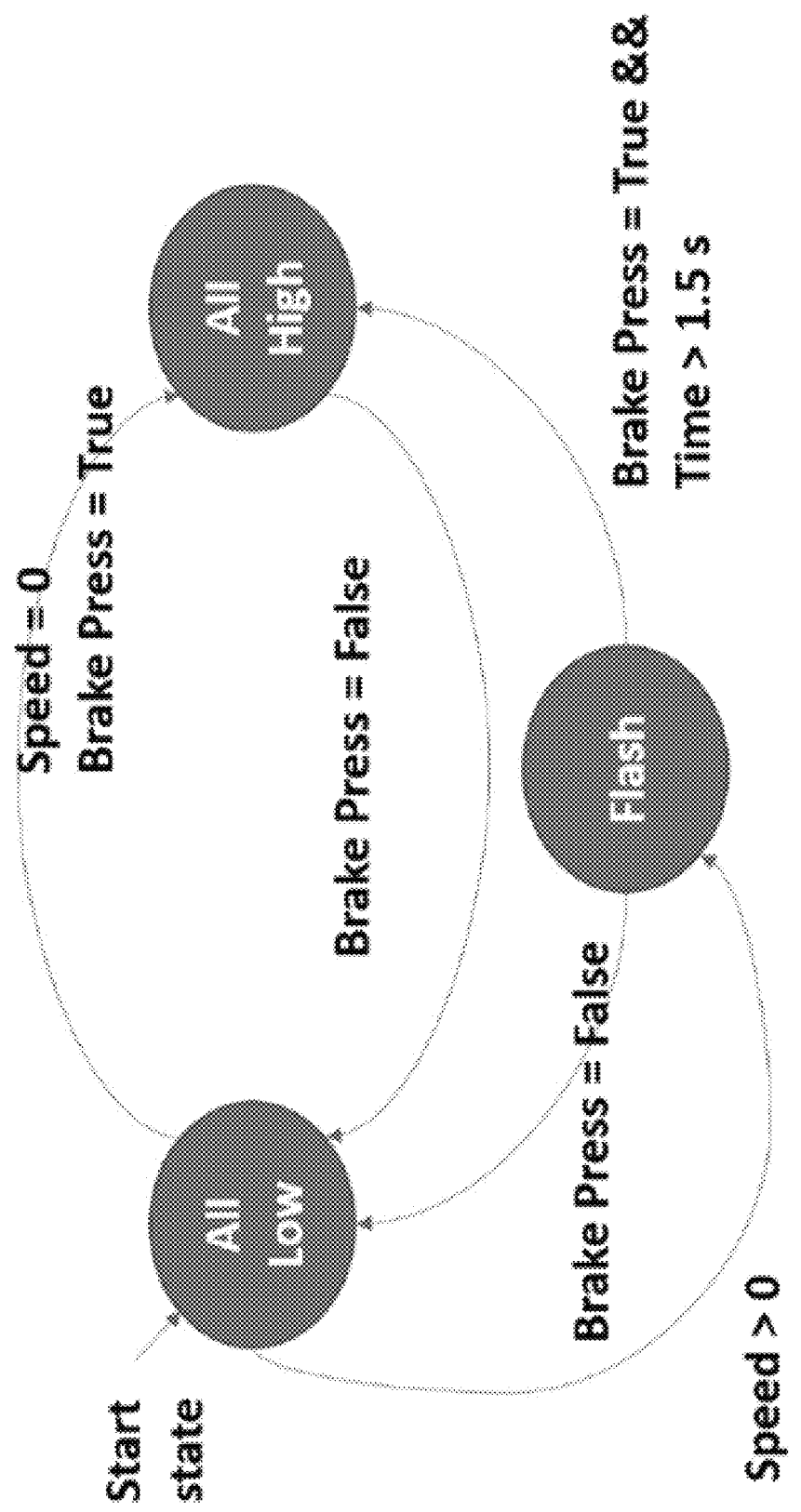
FIG. 2 is a state machine diagram showing a hybrid system representation of an example heavy vehicle braking system that includes a CPS used for illustration purposes to demonstrate the system of FIG. 1.
Figure 3:
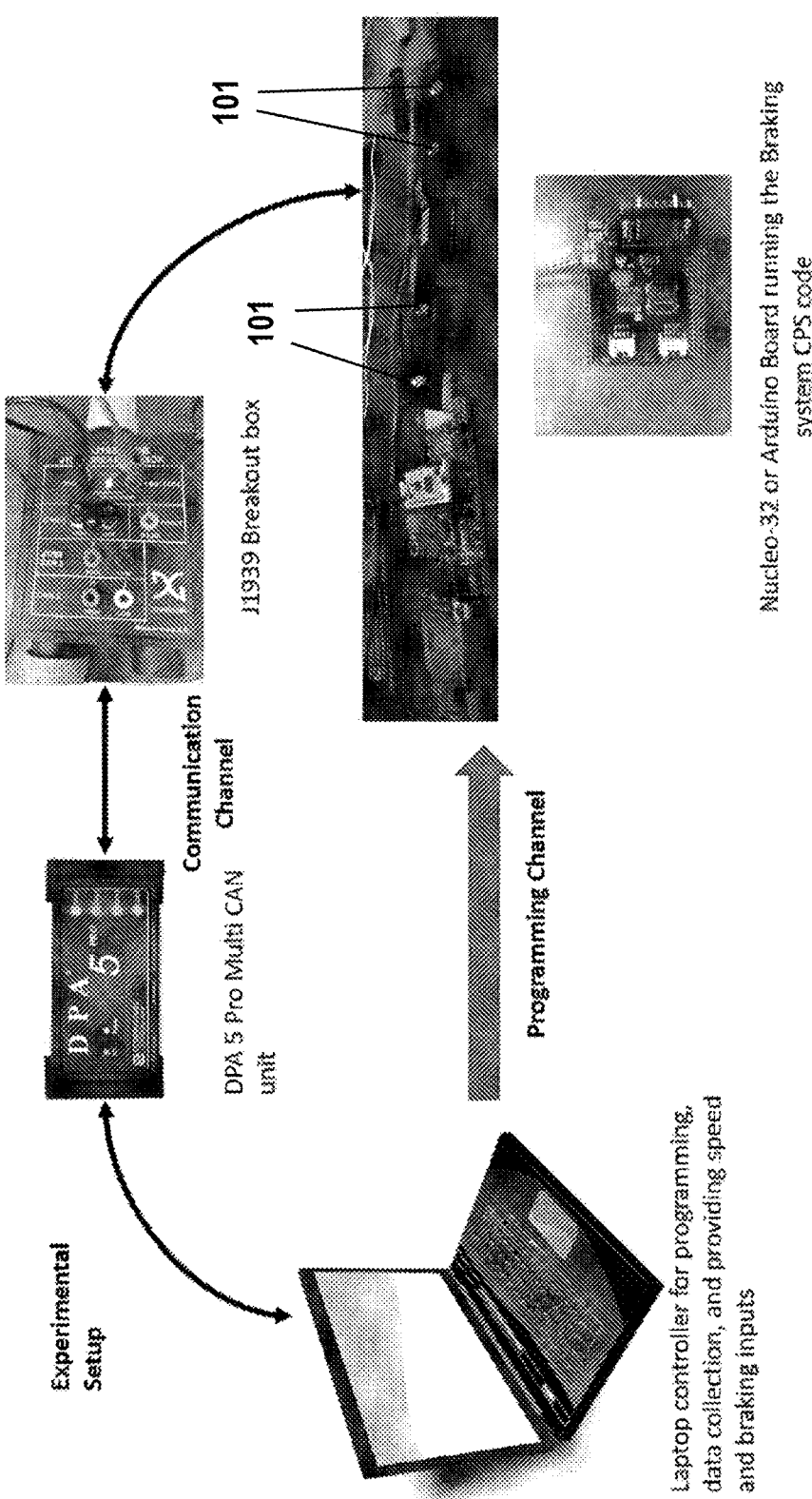
FIG. 3 is a simplified diagram showing an emulation setup for the example heavy vehicle braking system of FIG. 2 for validation of the system of FIG. 1.

The present disclosure shows usage of the system 100 on a heavy vehicle braking system emulation engine (FIGS. 2 and 3). The emulation engine includes an Arduino device that simulates the braking control code, which is connected to a desktop system through a CAN communication network. The desktop system provides a UI for the driver to provide braking and speed input. As such, the system 100 can identify CPS code snippets responsible for speed dependent braking actions and changes in timing constraints. Note that while the present disclosure presents an example of the heavy vehicle braking system emulation engine to demonstrate the system 100, the system 100 can be applied to cyber-physical systems of varying complexity and applicability.

2. Cyber-Physical Control System

A CPS typically includes a controller (e.g., a computing unit) that controls a physical system through control actions controlled by a control algorithm expressed as CPS control code executable by the controller. The controller takes inputs from the physical environment through one or more sensors and computes a control action, which is transmitted to an actuator that physically manipulates one or more aspects of the physical environment. The control algorithm can be modeled using m discrete modes of operation, $(I_1, I_2, \ldots, I_m)$, each with a different control policy. The physical system is represented using n continuous variables, which are governed by nonlinear differential equations. A popular formalism used for representing a CPS is a hybrid system, which includes a plurality of modes (e.g., discrete states) that correspond to unique control actions taken by the controller. Each mode has a dynamic model of a response from the physical environment corresponding to the control action for that mode. A transition can occur from one mode to the other depending on the valuation of the input and output variables of the controller; as such, transitions between modes are dictated by transition conditions that can be described in terms of the input and output variables.

A. Heavy Vehicle Braking System

In one example, a CPS includes a heavy vehicle braking system in which speed and brake press signals are inputs, whereas a light status is an output. The controller has three modes. The three modes are determined based on the light status: 1) all low mode, where all lights are low, 2) all high mode, where all lights are high, and 3) flashing mode, where lights flash depending on the duration of brake press. The dynamics of "all low mode" and "all high mode" are constants, while in the "flashing mode" the dynamics can be described as a square wave. Transitions between the modes are driven by guard conditions, which are conditions on the inputs and outputs of the braking system. FIG. 2 provides an illustration of an example hybrid system representation of the vehicle braking system.

An emulation engine is formulated for the heavy vehicle braking system as shown in FIG. 3 (DARPA AMP). The CPS control code of the braking system is executed on an embedded computing platform; in one example whose input-output traces are shown in FIGS. 5A-9D, the embedded computing platform is an Arduino, in another example whose input-output traces are shown in FIGS. 9A-9F that include two additional input variables, the computing platform is a Nucleo-32. The embedded computing platform is connected to a series of four lights (101 in FIG. 3) on a vehicle braking platform, which are used to display the response corresponding to a braking decision made by the CPS control code. The embedded computing platform is then connected to a laptop through two channels: a) a USB programming interface, and b) a Car Area Network (CAN) interface for two-way message transfer. A user interface developed in Python allows external input in terms of brake press and car speed to be fed into the CPS controller while the light status is read back at the laptop from the platform.

3. Architecture

Figure 4:
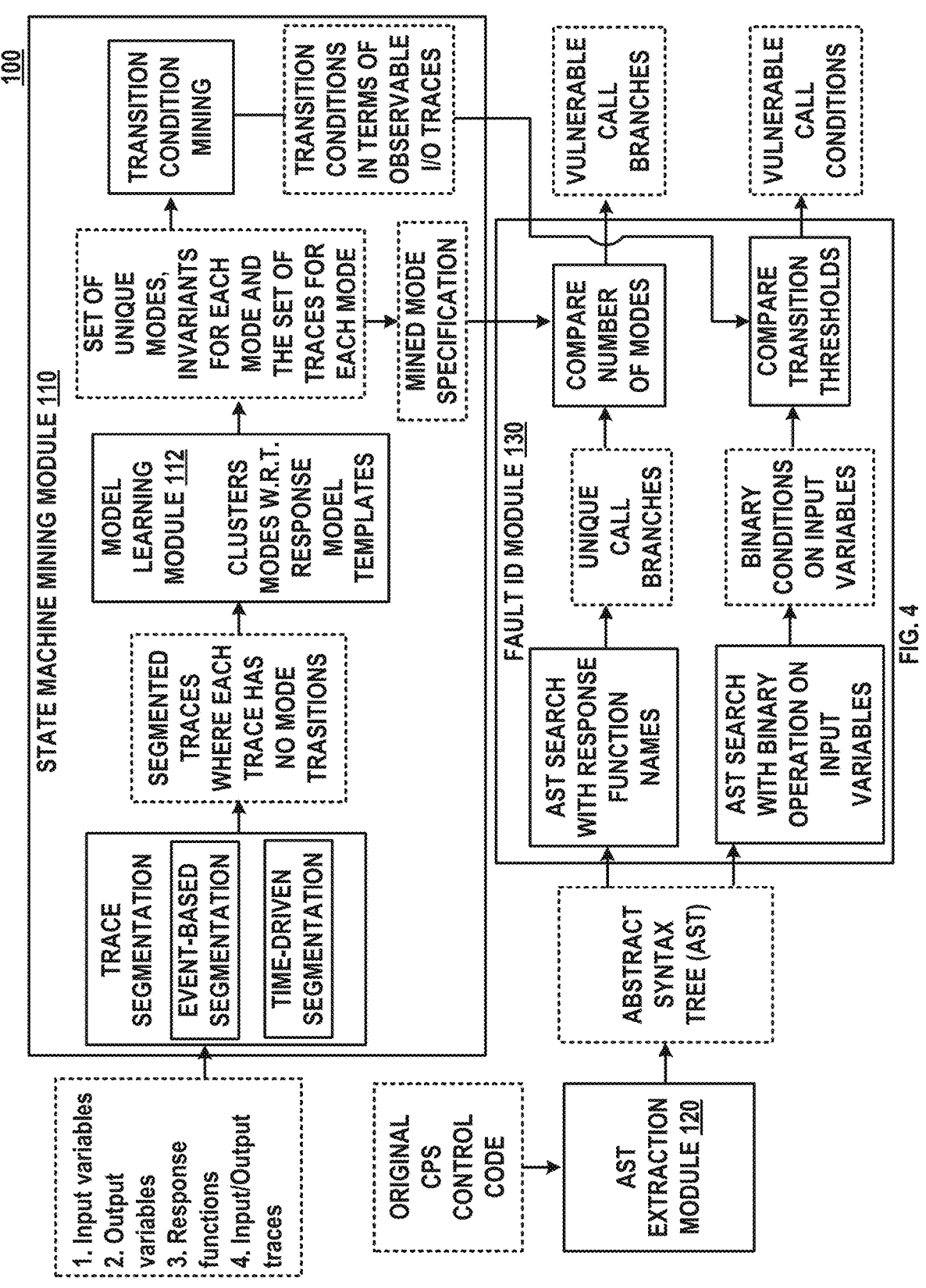
FIG. 4 is a block diagram showing inputs, inner components, and outputs of the system of FIG. 1.

The architecture of the system 100, illustrated in FIGS. 1 and 4 has three basic components: a) a State Machine Mining module 110 that "mines" a mined hybrid system representation of the CPS from I/O traces (e.g., an estimation of observed behavior of the CPS) an Abstract Syntax Tree extraction module 120 that extracts an abstract syntax tree (SDT) indicative of an extracted state machine representation (e.g., an extracted representation of expected behavior of the CPS) from CPS control code, and c) a fault identification module 130 that examines and provides an explanation of faults of the CPS in terms of response function call branches and call conditions by identifying discrepancies between the mined hybrid system representation and the extracted state machine representation. The present disclosure first discusses the inputs and outputs of the system 100 and then discusses the inner components of the system 100.

A. Inputs and Outputs

In some embodiments, the system 100 requires five inputs from the user:

1. The original (safety-assured) control code of the CPS before deployment.
2. The input arguments of the main function call in the control code.
3. The output variable names that describe the control output of the control code.
4. The definitions of the functions that invoke a change in the output variables of the CPS to illustrate a given response.
5. Traces of the input arguments and output variables of the deployed CPS.

The system 100 provides two categories of outputs:

1. Discrepancy in a number of unique response function call branches in the original CPS control code as compared to the deployed code.
2. Discrepancy in the response function call condition between the original CPS control code and deployed code in terms of thresholds on the input arguments of the original CPS control code.

B. Internals

The system 100 has three subcomponents:

1) Hybrid System Mining: The system 100 includes the State Machine Mining module 110 to "mine" the mined hybrid system representation from I/O data. In some embodiments, the State Machine Mining module 110 uses a HyMn mining method that extracts the mined hybrid system representation including discrete modes, response functions and transition conditions. The State Machine Mining module 110 implements various steps:

A) First step is I/O segmentation. The discrete operation of the hybrid model can be affected by three main components: a) external events that are generated by the user and are accompanied by time stamps and input configurations, b) system-generated timed events, and c) events generated due to threshold crossing of observable parameters of the physical system.

B) Second step is to cluster modes according to response models. This clustering step is required to minimize the redundancy in the number of discrete modes of the mined specification. In this step, output traces for each segment are passed through a model learning module 112. The model learning module 112 compares the segments with different forms of responses. The responses can be a constant value, or can be described by any waveform that can be generated using a Simulink waveform generator or a similar method. The model learning module 112 determines parameters of waveforms exhibited by each mode using a polynomial regression technique. Given a sample waveform $S_t(P)$ over time t and with parameter set P, the model learning module 112 attempts to match a template waveform $W_t(P_e)$ with an estimated parameter $P_e$. This this problem can be solved using a min/max sequential quadratic programming optimization approach. The overall optimization problem is developed as follows.

$$\text{find: } P_e \text{ to} \qquad\qquad (\text{Eq. 1})$$

Minimize: $|d(S_t(P), W_t(P_e))|^2$ where d is a measure of distance.

The distance metric to be used depends on the application. The heavy vehicle braking system discussed in the present disclosure can use dynamic time warping (DTVV) as the distance metric.

C) The third step is Transition Condition mining. In this step, each individual transition between a first mode mi and a second mode $m_2$ is labeled with a final value of input-output variables in the first mode mi and the initial value of the input-output variables in the second mode $m_2$. For every instance of transitions between the same modes, associated I/O labels are concatenated to develop a transition set. The transition condition from this set can be derived in terms of binary or unary operations on the input and output variables. In some embodiments, multiple transition conditions can be combined using OR AND operations.

An important factor is that the accuracy of a rectangular threshold in the transition condition is dependent on the sampling frequency. Higher sampling frequencies will result in capturing transitions near the boundary conditions resulting in higher accuracy.

As such, the State Machine Mining module 110 estimates a mined hybrid system representation descriptive of the CPS including a set of estimated modes and a set of estimated mode transition conditions.

(2) Abstract Syntax Tree Generation: The Abstract Syntax Tree extraction module 120 can extract an AST from the original CPS control code using tools such as a PYCParser python API. The Abstract Syntax Tree extraction module 120 generates the extracted state machine representation of the cyber-physical system including a set of extracted modes and a set of extracted mode transition conditions of the cyber-physical system.

(3) Hybrid System and Syntax Tree mapping: In this step, the fault identification module 130 the fault identification module 130 compares the mined hybrid system representation (obtained by the State Machine Mining module 110) with the extracted state machine representation (obtained by the Abstract Syntax Tree extraction module 120) and identifies discrepancies between the mined hybrid system representation and the extracted state machine representation. In particular, the fault identification module 130 compares the set of estimated modes and the set of estimated transition conditions from the mined hybrid system representation with respect to the set of extracted modes and the set of extracted transition conditions from the extracted state machine representation in order to examine and provide an explanation of faults of the CPS in terms of response function call branches and call conditions.

The aim of the fault identification module 130 is to match the estimated modes and the estimated transition conditions extracted by the State Machine Mining module 110 to the extracted modes and the extracted transition conditions within the AST obtained from the CPS control code through the Abstract Syntax Tree extraction module 120. In the AST, a unique branch that reaches from the root node to a response function indicates a function call sequence for a given input. Since each branch ends in a unique response function, this implies that the call sequence generates a unique response. Hence, a total number of unique branches in the AST from the root node to a response function indicates the number of modes in the hybrid system.

In a supervised control system, the CPS control code includes a main supervisory loop. Transitions to new modes thus happen through a call sequence that initiates from the main supervisory loop. Rectangular guards can then be expressed as a binary or unary operation on input or output variables. The fault identification module 130 of the system 100 thus searches the AST for binary or unary operations in each unique branch from the root node to a response function. A collection of all binary or unary operations in a path to the response function indicates transition conditions corresponding to specific modes.

4. Braking System Emulator

The operation of system 100 is demonstrated using the heavy vehicle braking system emulator described above with reference to FIGS. 2 and 3. Operation of the CPS control code can be represented by a hybrid system shown in FIG. 2. The CPS control code (e.g., Arduino code) that achieves the desired operation for the heavy vehicle braking system example is shown in Algorithm 1 below. The control code has two inputs represented by the variables speed_value and the brake_state, and four outputs represented by the variables INNER_RIGHT, INNER_LEFT, OUTER_RIGHT, and OUTER_LEFT. The control code has three response functions: a) brake on, that turns all four lights high, b) brake off, that turns all four lights low, and c) brake flash that keeps the outer lights high but flashes the inner lights. A time period associated with each flash is controlled by a variable flash_timer, while a number of flashes of the inner lights is controlled by a variable num_flashes.

A main function in the control code is loop. As shown in FIG. 2, the loop function initially keeps all four lights low (All Dim mode). Then, the loop function listens to the CAN bus for a speed_value input and brake_state input. If speed_value=0 and brake_state=true, then the brake on response function is called, turning all four lights high (transition from All Dim mode to All High mode). At this mode, if the brake_state becomes false. then the brake off response function is called resulting in all four lights turning low (transition from All High to All Dim mode). If the speed_value>0 and brake_state=true, then the brake flash response function is called, turning two outer lights high and causing the two inner lights to start flashing (transition from All Dim mode to Flash mode). In this particular example, the inner lights flash every 500 ms, and for 3 times. After 1.5 s of flash mode the brake on response function is called which turns all the lights high. This transition has a timing constraint which can result in safety violations if violated.

Algorithm 1: Heavy Vehicle Braking System Emulation Code

```
1    void loop(void) {
2        unsigned char len = 0;
3        unsigned char buf[8];
4        unsigned long id = 0;
5        unsigned int timer = 0;
6        if (CAN_MSGAVAIL == CAN.checkReceive( )){
7            CAN.read.MsgBufID(&id, &len, buf);
8            timer = micros( );
9            rx_message_routine(buf);
10           timer = micros( )-timer;
11       }
12       if (need_to_flash){
13           brake_flash( );}
14           analogWrite(INNER_RIGHT, INNER_BRAKE_STATE ?
                 ANALOG_BRIGHT : ANALOG_DIM);
15           analogWrite(INNER_LEFT, INNER_BRAKE_STATE ?
                 ANALOG_BRIGHT : ANALOG_DIM);
16           analogWrite(OUTER_RIGHT, INNER_BRAKE_STATE ?
                 ANALOG_BRIGHT : ANALOG_DIM);
17           analogWrite(OUTER_LEFT, INNER_BRAKE_STATE ?
                 ANALOG_BRIGHT : ANALOG_DIM);
18       }
19
20   void_rx_message_routine(unsigned char buf[ ])
21   uint16_t speed_value = (buf[3] « 8)+buf[2];
22   uint8_t brake_switch = (buf[4] &0b0000110) >> 2;
23   if (brake_switch){
24       brake_state = true;
25       brake_on( );
26       if speed_value > 0 && previous_brake_state != brake_state){
27           need_to_flash = true;
28       }
29   }
30   else{
31       brake_state = false;
32       need_to_flash = false;
33       brake_off();
34   }
35   previous_brake_state = brake_state;
36   }
37
38   void brake_on( ){
39       if(!need_to_flash){
40           INNER_BRAKE_STATE = HIGH;}
41           OUTER_BRAKE_STATE = HIGH;
42       }
43
44   void brake_off( ){
45       OUTER_BRAKE_STATE = INNER_BRAKE_STATE = LOW;
46       num_flashes = 0; //reset instrumentation
47   }
48
49   void brake_flash( )(
50       if (flash_timer > 250){
51           flash_timer = 0;
52           INNER_BRAKE_STATE = !INNER_BRAKE_STATE;
53           num_flashes++;
54       if (num_flashes > 5){
55           INNER_BRAKE_STATE = LOW;
56           num_flashes >5;
57       need_to_flash = false; } }
58   }
```

5. Usage

To show the usage of the system 100 with respect to the heavy vehicle braking system described above, two types of vulnerabilities in the CPS control code of the heavy vehicle braking system are considered:

A. Vulnerabilities

There are two kinds of changes in response due to CPS code vulnerabilities: a) actuation condition, and b) actuation input, which results in a change in timing properties.

Change in Actuation Condition: A first example vulnerability considered in this example is that the speed_value variable is declared as a signed int instead of uint16_t in the function rx_message_routine. As a result, a maximum value of speed_value variable can only be 127. Any value above 127 is considered as negative number. This vulnerability significantly changes the operational characteristics of the heavy vehicle braking system. Whenever the input speed is greater than 127, and the brake is pressed, the lights turn from all low to all high without flashing in violation of safety constraints. The heavy vehicle braking system exhibits the same behavior when the input value of speed_value is 0.

Change in Timing Properties: A second line in the brake flash( ) response function checks for the timing between two flashes. A second example vulnerability considered in this manuscript is related to the tampering of this temporal condition. Consider an altered CPS control code where instead of the current condition in the "if" statement, the CPS control code states flash timer >300.

B. System inputs

There are five inputs for the system 100 as follows:

1. Input Variables: speed_value and brake_state.
2. Output Variables: INNER_RIGHT, INNER_LEFT, OUTER_RIGHT, and OUTER_LEFT
3. Response Functions: brake ono, brake off( ) and brake flash.
4. I/O Traces: Time series traces of the input and output variables of the CPS code as shown in FIGS. 5A-5D.
5. Original CPS control code: The Arduino code as shown above in Algorithm 1.

For the heavy vehicle braking system example used in this disclosure, a 3 minute observation was taken of I/O traces from the CPS control code at a sampling frequency of 4 Hz. The trace is shown in FIGS. 5A-5D, which includes traces of six variables from the CPS control code.

C. Hybrid System Extraction Module

Figure 6:
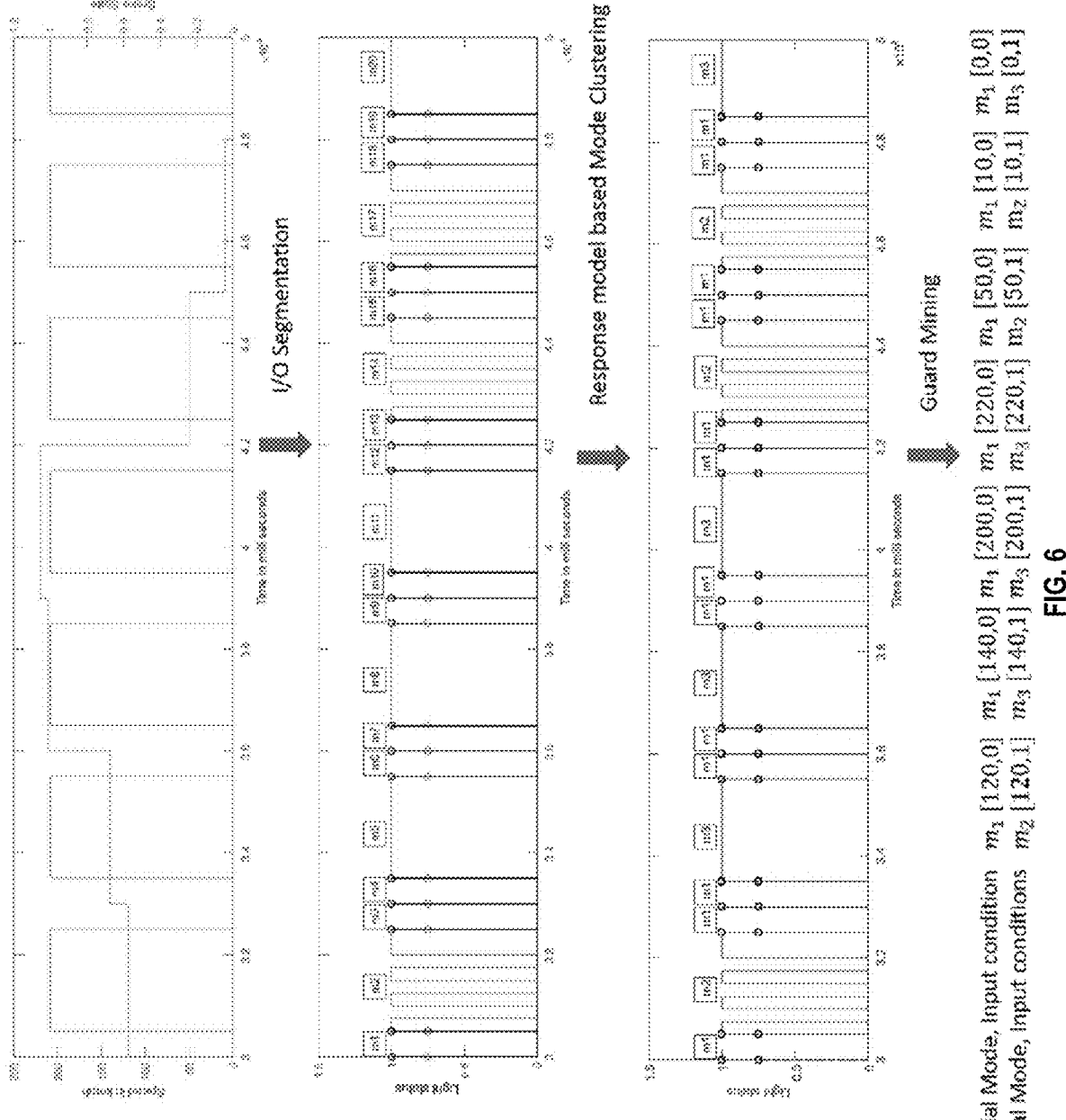
FIG. 6 is a graphical representation showing hybrid system mode and transition condition extraction using the example heavy vehicle braking system of FIG. 2 by the system of FIG. 1.
Figure 7:
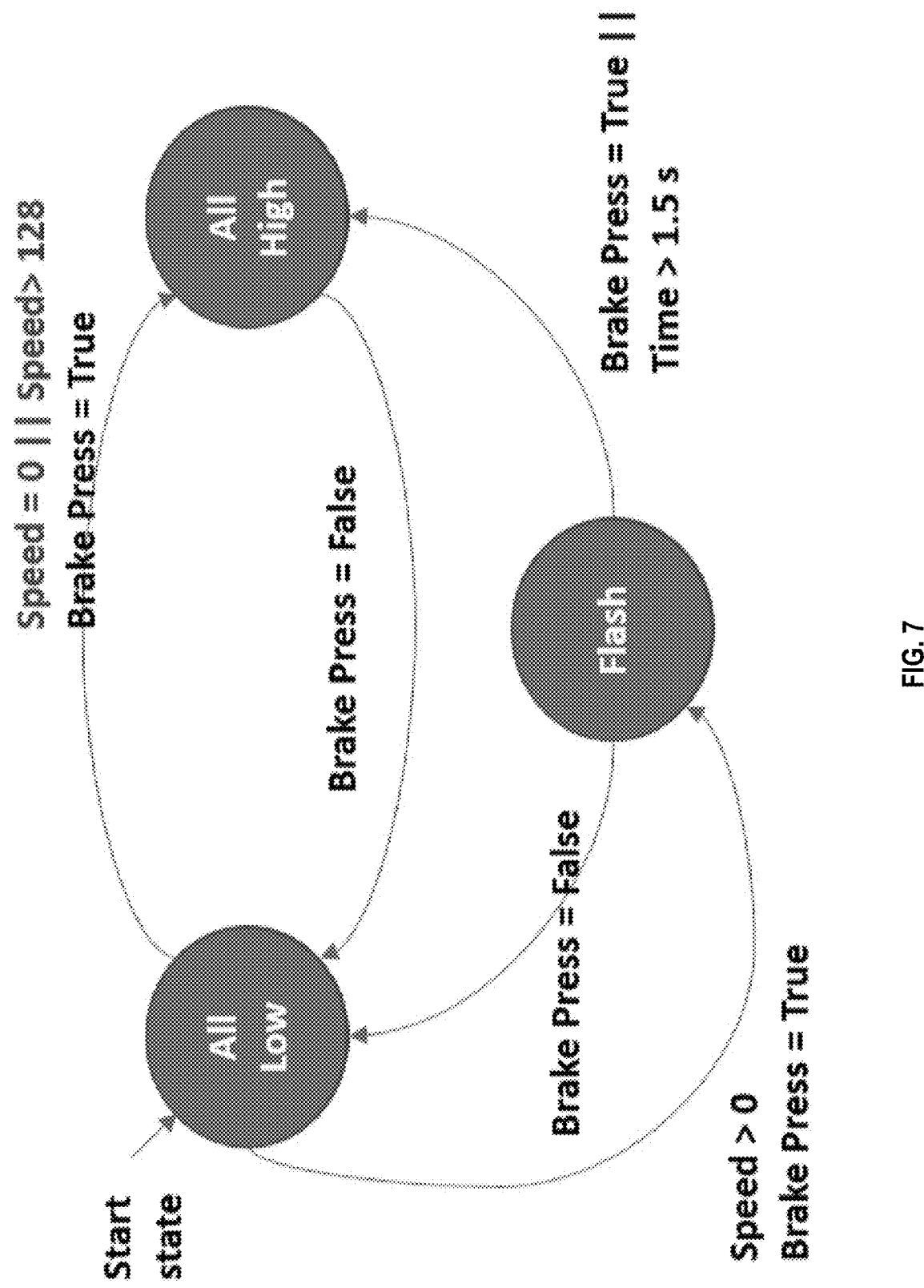
FIG. 7 is a state machine diagram showing a hybrid system representation of the example heavy vehicle braking system of FIG. 2, where the example heavy vehicle braking system includes intentionally-introduced vulnerabilities for validation of the system of FIG. 1.

A hybrid system extraction method for estimating the mined hybrid system representation employed by the State Machine Mining module 110 is shown step by step for the first example vulnerability described above. A first step includes I/O segmentation to segment output traces based on changes in input variables to identify the set of estimated modes. As shown in FIG. 6, this results in large number of segments, each of which could be a potential new estimated mode in the mined hybrid system representation.

The next step includes response model-based mode clustering. Template waves used in this example are step functions and square wave functions. The optimization steps discussed above in Section 3B derive constant step values of the step function and also derives a time period and number of waves for the square wave function. These parameters are then used to cluster the segments into a set of estimated modes using a Density based Scanning (DBScan) algorithm. The clustering process results in three modes as shown in FIG. 6.

The next step is guard mining, which infers or otherwise estimates the estimated transition conditions from the input variables of the CPS control code. For the vulnerable CPS control code, note that mode changes between mode $m_1$ (All Dim mode) and $m_2$ (Flashing mode) occurs when speed_value is greater than 0 and the brake state changes from 0 to 1. A mode change from m2 to mi occurs when the brake state changes from 1 to 0. However, we see that when speed_value>140 I speed_value=0 and brake state changes from 0 to 1, the mode changes from $m_1$ to $m_3$. Hence, an example mined hybrid system representation of the CPS control code as obtained using the input-output traces is shown in the state machine representation of FIG. 7.

D. Generation of Abstract Syntax Tree

The CPS control code in the braking system includes C++ code with external APIs such as a CAN bus API and elapsedmillis.

Figure 8:
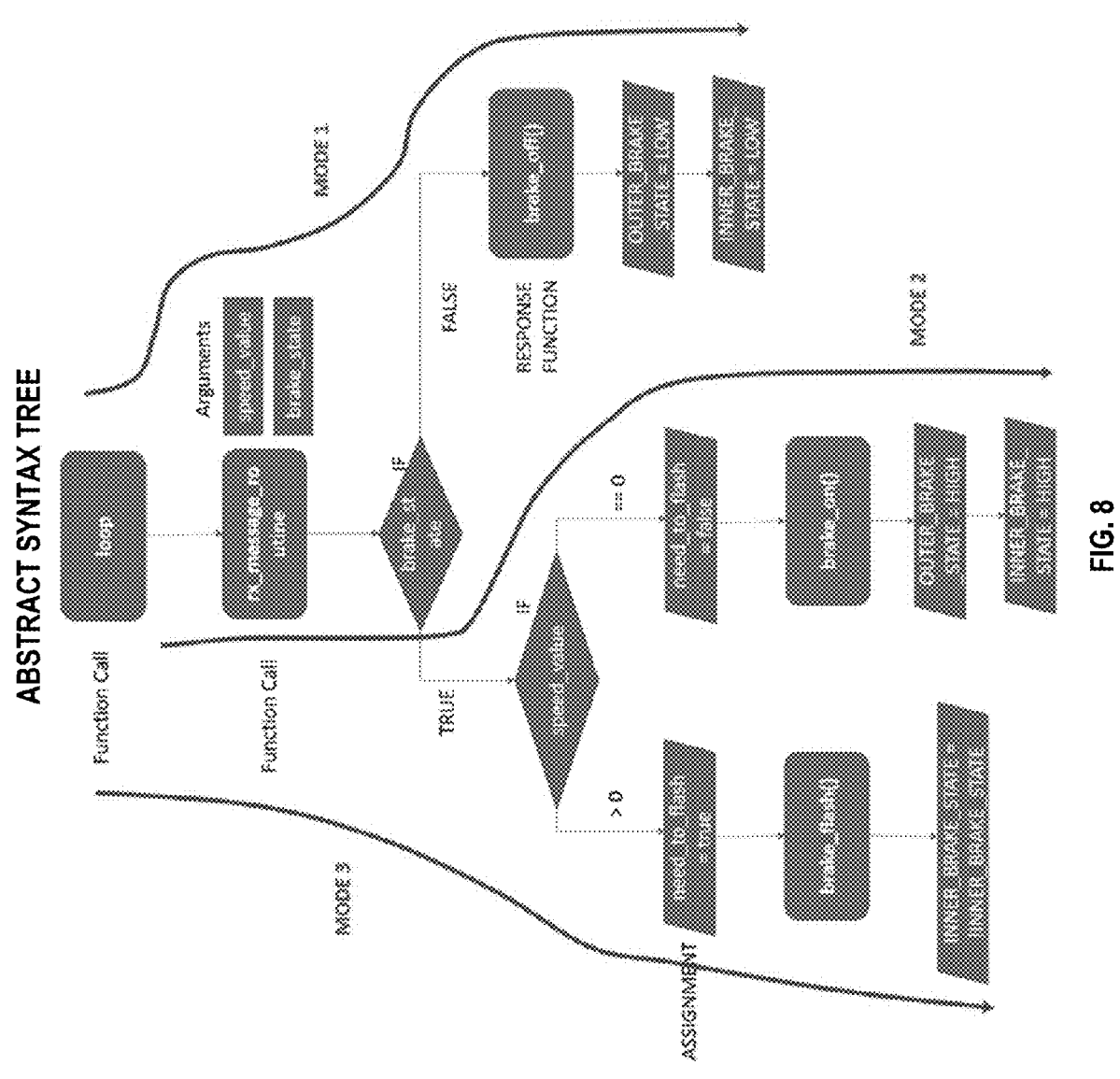
FIG. 8 is an example abstract syntax tree generated by the system of FIG. 1 based on the example heavy vehicle braking system of FIG. 2.
Figures 9A, 9B, 9C, 9D, 9E, 9F:
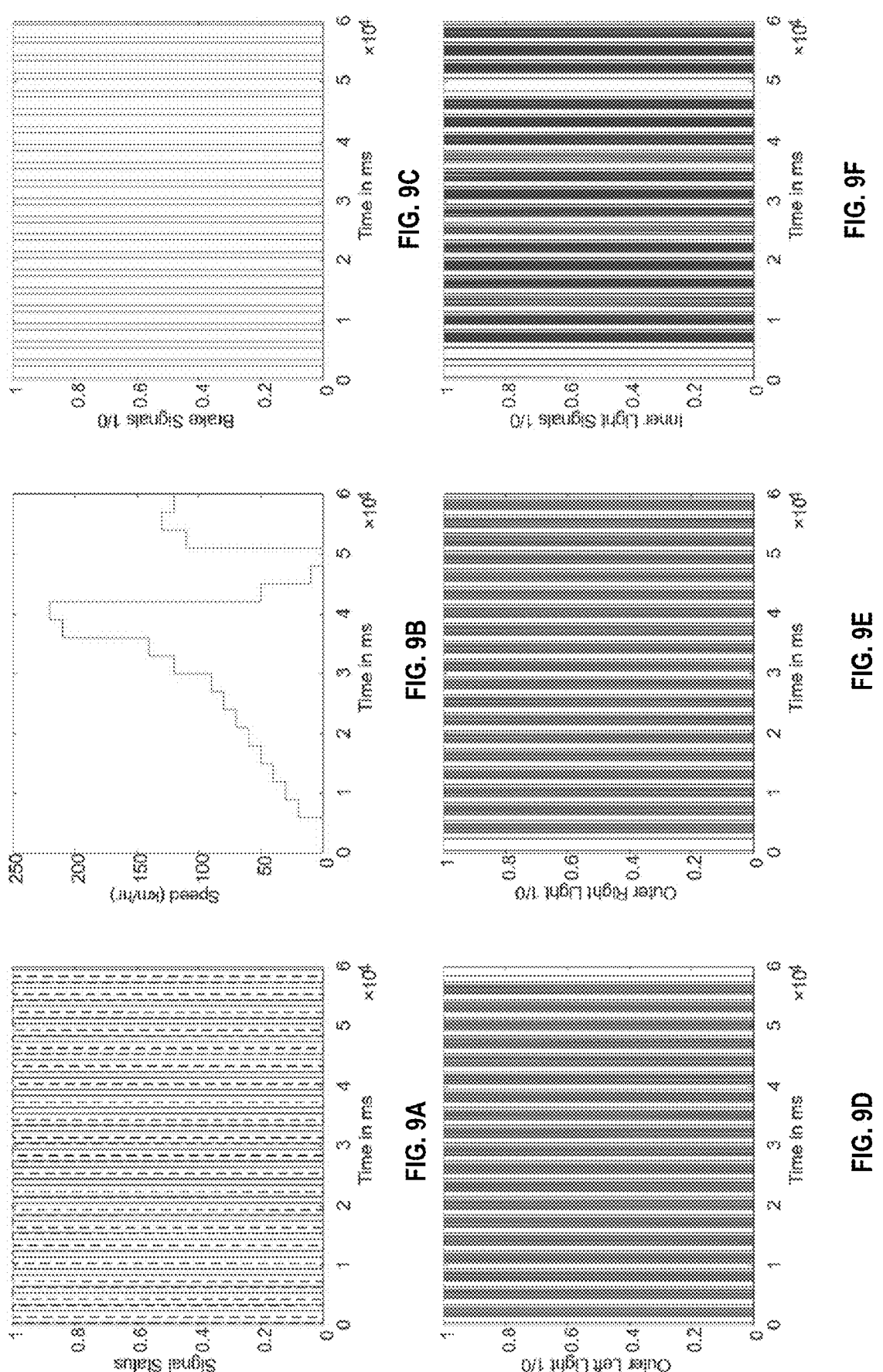
FIGS. 9A-9F are a series of graphical representations showing input-output traces of an example heavy vehicle braking system similar to that of FIG. 2 but including two additional input variables for validation of the system of FIG. 1, FIGS. 10A-10C are a series of process flow diagrams showing a method for detecting faults (e.g., deviations from expected operation) in a CPS implemented by the system of FIG. 1.

The Abstract Syntax Tree extraction module 120 can use tools such as the PYCParser python API to generate the AST representative of the CPS control code. The AST provides function, variable definitions and call graphs. One example AST for the heavy vehicle braking system is shown in FIG. 8. The AST results in the extracted state machine representation of the CPS including the set of extracted modes and the set of extracted mode transition conditions of the cyber-physical system.

E. Matching of Syntax Tree to Modes and Transitions

A method employed by the fault identification module 130 to generate mode and transition conditions from the AST is shown in the pseudocode provided in Algorithm 2. A path from the root node of the AST to a node corresponding to any of the response function calls is potentially a new mode in the hybrid system representation of the CPS control code. Each possible path is then grouped with respect to two types of nodes in the path: a) response function call node, and b) output variable assignment node. If two paths have the same response function call node and output variable assignments, then the fault identification module 130 groups the two paths into the same mode in the finite state machine representation of the CPS control code. This grouping mechanism provides the total number and types of modes in the finite state machine representation of the CPS control code.

The next step taken by the fault identification module 130 is to match the binary or unary conditions in each branch of the AST with the transition conditions between two modes. The modes and the transitions from the AST are then matched with those obtained from the State Machine Mining module 110. In the example, the state machine showed transitions between modes based on two different conditions on the speed_value input variable. However, in the syntax tree (FIG. 8), there is only one instance of a binary or unary operation on the speed_value input variable. This indicates that there is a vulnerability in the CPS operation related to the speed_value input variable. As such, the fault identification module 130 flags this vulnerability for display to a user.

---

Algorithm 2: Pseudocode for generating mode and transition sets from AST

1  [Modes $M_e$, Transtion set $T_s$] = Syntax-Tree-Exploration(AST, Set of
   Response Functions $F_s$, input variable set 1, output variable set 0){
2  For each response function $f_r$ in the Path Set ← Path Set u Depth-
   First-
   Search(root, $f_r$)
3  mode $m_1$ =first path from path set
4  k = 1
5  Estimated mode set $M_e$ <- $M_1$
6  For each path pi in Path set
7  if( destination node $f_r$ not in any path in $M_e$ )
8  k = k + 1
9  Add new mode $m_k$ to mode set $M_e$
10 Else if (assignment operation on 0 not seen in any path associated
   with
   $M_e$

---

10

Algorithm 2: Pseudocode for generating mode and transition sets from AST 11 k = k + 1
12 Add new mode $m_k$ to mode set $M_e$
13 For each logical operation involving an element of I in path $p_i$
14 $T_s$ <- $T_s$ ∪ B

---

F. Results for Timing Property changes

In the heavy vehicle braking system example, the timing property relates to the time period between flashes of the lights. In the second example vulnerability discussed above, when the speed is greater than 128 kmph, the flash interval was increased to 300 ms. During extraction of the state machine extraction, instead of three modes, the State Machine Mining module 110 obtained four. This is because the increased flash intervals implies a different response function than originally intended. Minmax-based parameter extraction employed by the State Machine Mining module 110 successfully identified the changes in time parameters between the two different flash response modes.

G. Vehicle Maneuvering system

A second CPS example is similar to the Arduino example but includes two more inputs: a left turn signal and right turn signal. The second CPS example has modes as shown in FIG. 2 with the exception of two more modes corresponding to the left turn signal and the right turn signal. Whenever the left turn signal or the right turn signal is high, then the outer left light or the outer right light starts blinking and keeps blinking until the left turn signal or the right turn signal is turned off. This blinking continues irrespective of the brake pedal being pressed or not. The two inner lights operate the same way as the CPS example in FIG. 2. This example increases complexity by introducing more timing properties resulting in two additional modes with different response characteristics.

I/O characteristics are shown in FIGS. 9A-9F. The State Machine Mining module 110 derived five modes from the input output characteristics. The modes included All high, All Dim, and inner flashing mode. In addition, the State Machine Mining module 110 also identified an outer right flashing mode and an outer left flashing mode. The State Machine Mining module 110 also correctly derived transition conditions on the two new input variables corresponding to the left turn signal and the right turn signal.

6. Process

FIGS. 10A-10C show a method 200 for identifying deviation between intended operation of control code of a CPS and observed behavior of the CPS during deployment. Block 202 of method 200 includes receiving, at a processor, a set of input-output data resultant of operation of a cyber-physical system. Block 204 includes receiving one or more input argument names that are used as input to the set of operational mode transition conditions of the cyber-physical system. Block 206 includes receiving one or more output variable names that are control outputs of the cyber-physical system. Block 208 includes receiving one or more response function names descriptive of one or more response functions according to the set of operational modes of the cyber-physical system.

Blocks 210-216 can be implemented by the State Machine Mining module 110. In particular, block 210 includes estimating, at the processor and using the set of input-output data, a mined hybrid system representation descriptive of the cyber-physical system including a set of estimated modes and a set of estimated mode transition conditions. Block 210 includes various sub-steps, including blocks 212-216. Block 212 includes clustering the input-output data using the one or more input argument names, the one or more output variable names and the one or more response function names. Block 214 includes inferring an estimated response function of the mined hybrid system representation associated with each estimated mode of the set of estimated modes based on the input-output data. Block 216 includes inferring the set of estimated mode transition conditions of the mined hybrid system representation using the input-output data, the one or more input argument names and the one or more output variable names.

Blocks 218-228 can be implemented by the Abstract Syntax Tree extraction module 120. In particular, block 218 includes receiving, at the processor, a set of machine-readable instructions (e.g., the original CPS code) that control operation of the CPS. Block 220 includes generating, using the set of machine-readable instructions, an abstract syntax tree descriptive of an extracted state machine representation of the cyber-physical system including a set of extracted modes and a set of extracted mode transition conditions of the cyber-physical system. Block 220 includes various sub-steps, including blocks 222-228. Block 222 includes identifying a conditional statement within the set of machine-readable instructions. Block 224 includes generating a conditional node of the one or more one or more conditional nodes of the abstract syntax tree, the conditional node being descriptive of an extracted mode transition condition of the set of extracted mode transition conditions based on the conditional statement within the set of machine-readable instructions, the conditional node being associated with an input argument. Block 226 includes identifying a response function within the set of machine-readable instructions associated with the conditional statement. Block 228 includes generating a response function call node of the abstract syntax tree, the response function call node being descriptive of an extracted mode of the set of extracted modes based on the response function within the set of machine-readable instructions, the response function call node being dependent on an input argument associated with the respective conditional statement.

Blocks 230-242 can be implemented by the fault identification module 130. In particular, block 230 includes comparing the mined hybrid system representation with the extracted state machine representation, and can include sub-steps described in blocks 232 and 234. Block 232 includes grouping one or more response function call nodes within each unique path of the plurality of paths of the abstract syntax tree into the set of extracted modes. Block 234 includes grouping one or more conditional nodes within each unique path of the plurality of paths of the abstract syntax tree into the set of extracted mode transition conditions.

The fault identification module 130 also implements block 236, which can include sub-steps shown in blocks 238 and 240. Block 236 includes identifying a discrepancy between the mined hybrid system representation and the extracted state machine representation. Block 238 includes identifying a mode discrepancy between the set of estimated modes of the mined hybrid system representation and the set of extracted modes of the extracted state machine representation. Block 240 includes identifying a transition discrepancy between the set of estimated mode transitions of the mined hybrid system representation and the set of extracted mode transitions of the extracted state machine representation.

The system 100 can further implement block 242, in which the system 100 displays, at a display device in communication with the processor, information about the discrepancy between the mined hybrid system representation and the extracted state machine representation.

7. Computer-Implemented System

Figure 11:
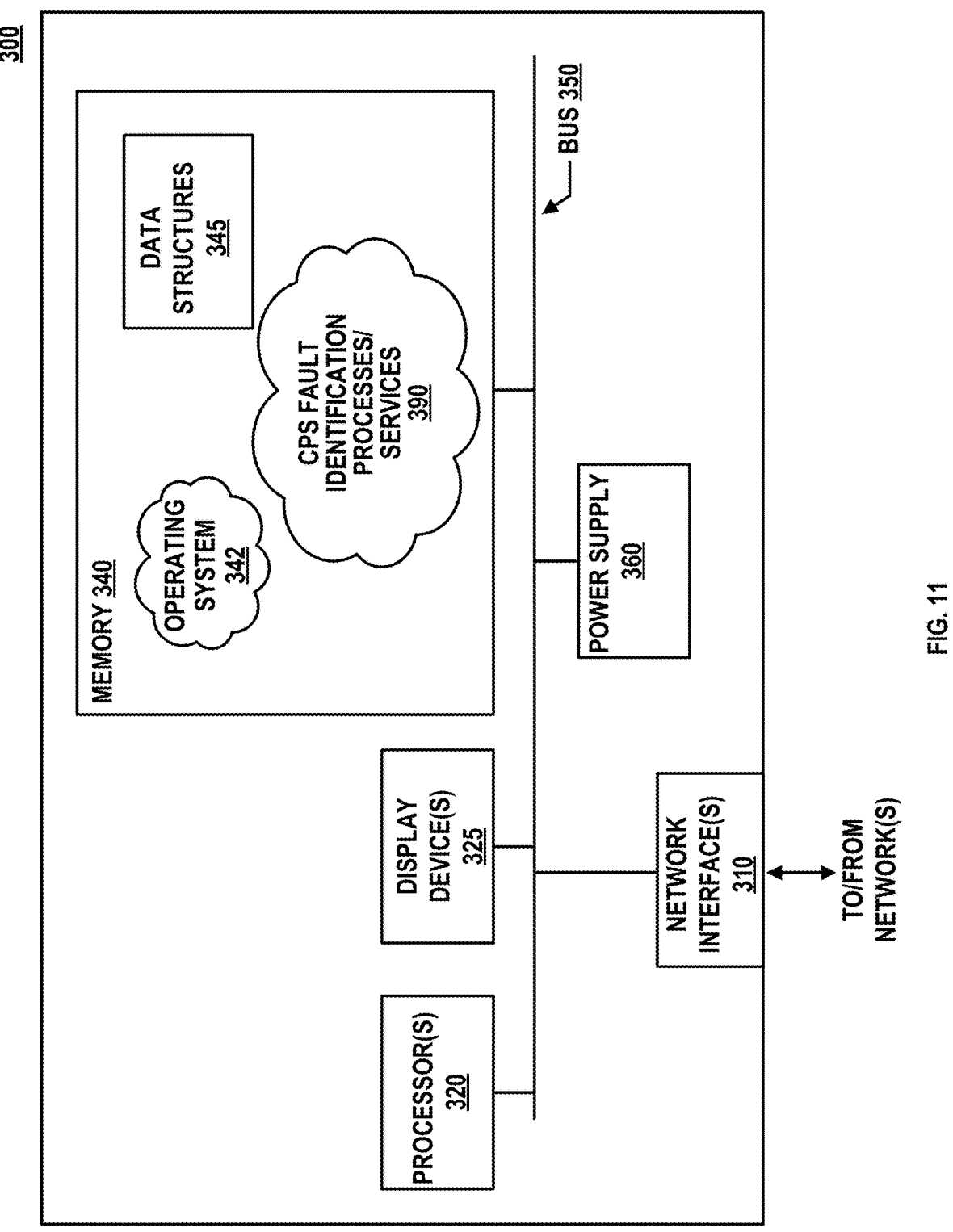
FIG. 11 is a simplified diagram showing an example computing system for implementation of the system of FIG. 1.

FIG. 11 is a schematic block diagram of an example device 300 that may be used with one or more embodiments described herein, e.g., as a component of system 100 shown in FIG. 1 that implements aspects of method 200 shown in FIGS. 10A-10C.

Device 300 comprises one or more network interfaces 310 (e.g., wired, wireless, PLC, etc.), at least one processor 320, and a memory 340 interconnected by a system bus 350, as well as a power supply 360 (e.g., battery, plug-in, etc.). Further, device 300 can include one or more display devices 325 in communication with processor 320 that displays information to a user.

Network interface(s) 310 include the mechanical, electrical, and signaling circuitry for communicating data over the communication links coupled to a communication network. Network interfaces 310 are configured to transmit and/or receive data using a variety of different communication protocols. As illustrated, the box representing network interfaces 310 is shown for simplicity, and it is appreciated that such interfaces may represent different types of network connections such as wireless and wired (physical) connections. Network interfaces 310 are shown separately from power supply 360, however it is appreciated that the interfaces that support PLC protocols may communicate through power supply 360 and/or may be an integral component coupled to power supply 360.

Memory 340 includes a plurality of storage locations that are addressable by processor 320 and network interfaces 310 for storing software programs and data structures associated with the embodiments described herein. In some embodiments, device 300 may have limited memory or no memory (e.g., no memory for storage other than for programs/processes operating on the device and associated caches).

Processor 320 comprises hardware elements or logic adapted to execute the software programs (e.g., instructions) and manipulate data structures 345. An operating system 342, portions of which are typically resident in memory 340 and executed by the processor, functionally organizes device 300 by, inter alia, invoking operations in support of software processes and/or services executing on the device. These software processes and/or services may include CPS fault identification processes/services 390 which can include a set of instructions within the memory 340 that implement aspects of system 100 and method 200 when executed by the processor 320. Note that while CPS fault identification processes/services 390 is illustrated in centralized memory 340, alternative embodiments provide for the process to be operated within the network interfaces 310, such as a component of a MAC layer, and/or as part of a distributed computing network environment.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules or engines configured to operate in accordance with the techniques herein (e.g., according to the functionality of a similar process). In this context, the term module and engine may be interchangeable. In general, the term module or engine refers to model or an organization of interrelated software components/functions. Further, while the CPS fault identification processes/services 390 is shown as a standalone process, those skilled in the art will appreciate that this process may be executed as a routine or module within other processes.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A system for determining a cause of deviation from expected operation of a cyber-physical system, comprising:

a braking system including a plurality of lights; and a processor in operable connection to the plurality of lights of the braking system that activate one or more of the plurality of lights to display a braking decision, the processor being in communication with a memory, the memory including instructions, which, when executed by the processor, cause the processor to:

receive, at the processor, a set of input-output data, the set of input-output data being resultant of operation of the braking system, the set of input-output data including speed and brake signals as inputs, and a light status as an output comprising time-stamped samples acquired during operation of the braking system;

estimate, at the processor and using the set of input-output data, a mined hybrid system representation descriptive of the braking system including a set of estimated braking modes and a set of estimated mode transition conditions comprising conditions on the input-output data of the braking system;

receive, at the processor, a set of machine-readable instructions that control operation of the braking system;

generate, using the set of machine-readable instructions, an abstract syntax tree, the abstract syntax tree being descriptive of an extracted state machine representation of the braking system including a set of extracted modes and a set of extracted mode transition conditions of the braking system and including a plurality of paths each extending from a root node and including one or more conditional nodes and one or more resulting nodes, each conditional node of the one or more conditional nodes being associated with an input argument, the one or more resulting nodes including (i) a response function call node associated with a conditional node of the one or more conditional nodes and causing the braking system to implement an operational mode of the set of operational modes based on a value of the input argument associated with the conditional node and (ii) an output variable assignment node associated with a conditional node of the one or more conditional nodes;

compare the mined hybrid system representation with the extracted state machine representation; and identify a discrepancy between the mined hybrid system representation and the extracted state machine representation, wherein identifying the discrepancy comprises:

grouping one or more response function call nodes within each unique path of the plurality of paths of the abstract syntax tree into the set of extracted modes;

grouping one or more conditional nodes within each unique path of the plurality of paths of the abstract syntax tree into the set of extracted mode transition conditions;

determining that a first estimated braking mode of the set of estimated braking modes or a first estimated mode transition condition of the set of estimated mode transition conditions lacks a corresponding extracted mode or extracted mode transition condition obtained from the abstract syntax tree; and associating the discrepancy with at least one conditional node and at least one response function call node of a respective path of the abstract syntax tree, the discrepancy being indicative of a vulnerability in braking control code of the braking system.

2. The system of claim 1, the memory further including instructions, which, when executed by the processor, cause the processor to:

display, at a display device in communication with the processor, information about the discrepancy between the mined hybrid system representation and the extracted state machine representation.

3. The system of claim 2, the memory further including instructions, which, when executed by the processor, cause the processor to:

identify a mode discrepancy between the set of estimated modes of the mined hybrid system representation and the set of extracted modes of the extracted state machine representation.

4. The system of claim 2, the memory further including instructions, which, when executed by the processor, cause the processor to:

identify a transition discrepancy between the set of estimated mode transition conditions of the mined hybrid system representation and the set of extracted mode transition conditions of the extracted state machine representation.

5. The system of claim 1, the braking system defining a set of operational modes and being operable to transition between a first operational mode and a second operational mode of the set of operational modes according to an operational mode transition condition of a set of operational mode transition conditions.

6. The system of claim 5, the set of estimated modes being estimations of the set of operational modes exhibited within the set of input-output data and the set of estimated mode transition conditions being estimations of the set of operational mode transition conditions exhibited within the set of input-output data.

7. The system of claim 5, the set of extracted modes being representations of the set of operational modes as extracted from the set of machine-readable instructions and the set of extracted mode transition conditions being representations of the set of operational mode transition conditions as extracted from the set of machine-readable instructions.

8. The system of claim 5, the abstract syntax tree including a plurality of paths, each path including one or more conditional nodes and one or more resulting nodes, each conditional node of the one or more conditional nodes being associated with an input argument.

9. The system of claim 8, the one or more resulting nodes including:

a response function call node associated with a conditional node of the one or more conditional nodes and causing the braking system to implement an operational mode of the set of operational modes based on a value of the input argument associated with the conditional node; and an output variable assignment node associated with a conditional node of the one or more conditional nodes.

10. The system of claim 8, the memory further including instructions, which, when executed by the processor, cause the processor to:

identify a conditional statement within the set of machine-readable instructions; and generate a conditional node of the one or more conditional nodes of the abstract syntax tree, the conditional node being descriptive of an extracted mode transition condition of the set of extracted mode transition conditions based on the conditional statement within the set of machine-readable instructions, the conditional node being associated with an input argument.

11. The system of claim 8, the memory further including instructions, which, when executed by the processor, cause the processor to:

identify a response function within the set of machine-readable instructions associated with a conditional statement; and generate a response function call node of the abstract syntax tree, the response function call node being descriptive of an extracted mode of the set of extracted modes based on the response function within the set of machine-readable instructions, the response function call node being dependent on an input argument associated with the conditional statement.

12. The system of claim 8, the memory further including instructions, which, when executed by the processor, cause the processor to:

group one or more response function call nodes within each unique path of the plurality of paths of the abstract syntax tree into the set of extracted modes.

13. The system of claim 8, the memory further including instructions, which, when executed by the processor, cause the processor to:

group one or more conditional nodes within each unique path of the plurality of paths of the abstract syntax tree into the set of extracted mode transition conditions.

14. The system of claim 5, the memory further including instructions, which, when executed by the processor, cause the processor to:

receive one or more input argument names that are used as input to the set of operational mode transition conditions of the braking system;

receive one or more output variable names that are control outputs of the braking system; and receive one or more response function names descriptive of one or more response functions according to the set of operational modes of the braking system.

15. The system of claim 14, the memory further including instructions, which, when executed by the processor, cause the processor to:

cluster the set of input-output data using the one or more input argument names, the one or more output variable names and the one or more response function names;

infer an estimated response function of the mined hybrid system representation associated with each estimated mode of the set of estimated modes based on the set of input-output data; and infer the set of estimated mode transition conditions of the mined hybrid system representation using the set of input-output data, the one or more input argument names and the one or more output variable names.

16. A method, comprising:

receiving, at a processor in communication with a memory, a set of input-output data, the set of input-output data being resultant of operation of a braking system, the braking system defining a set of operational modes and being operable to transition between a first operational mode and a second operational mode of the set of operational modes according to an operational mode transition condition of a set of operational mode transition conditions, the set of input-output data including speed and brake signals as inputs and a light status as an output and comprising time-stamped samples acquired during operation of the braking system;

estimating, at the processor and using the set of input-output data, a mined hybrid system representation descriptive of the braking system including a set of estimated modes and a set of estimated mode transition conditions;

receiving, at the processor, a set of machine-readable instructions that control operation of the braking system;

generating, using the set of machine-readable instructions, an abstract syntax tree, the abstract syntax tree being descriptive of an extracted state machine representation of the braking system including a set of extracted modes and a set of extracted mode transition conditions of the braking system, the abstract syntax tree including a plurality of paths, each path including one or more conditional nodes and one or more resulting nodes, each conditional node of the one or more conditional nodes being associated with an input argument, the one or more resulting nodes including:

a response function call node associated with a conditional node of the one or more conditional nodes and causing the braking system to implement an operational mode of the set of operational modes based on a value of the input argument associated with the conditional node; and an output variable assignment node associated with a conditional node of the one or more conditional nodes;

comparing the mined hybrid system representation with the extracted state machine representation; and identifying a discrepancy between the mined hybrid system representation and the extracted state machine representation, wherein identifying the discrepancy comprises: grouping one or more response function call nodes within each unique path of the plurality of paths of the abstract syntax tree into the set of extracted modes; grouping one or more conditional nodes within each unique path of the plurality of paths of the abstract syntax tree into the set of extracted mode transition conditions; determining that a first estimated mode of the set of estimated modes or a first estimated mode transition condition of the set of estimated mode transition conditions lacks a corresponding extracted mode or extracted mode transition condition obtained from the abstract syntax tree; and associating the discrepancy with at least one conditional node and at least one response function call node of a respective path of the abstract syntax tree, the discrepancy being indicative of a vulnerability in braking control code of the braking system.

17. The method of claim 16, further comprising:

displaying, at a display device in communication with the processor, information about the discrepancy between the mined hybrid system representation and the extracted state machine representation.

18. The method of claim 17, further comprising:

identifying a mode discrepancy between the set of estimated modes of the mined hybrid system representation and the set of extracted modes of the extracted state machine representation.

19. The method of claim 17, further comprising:

identifying a transition discrepancy between the set of estimated mode transition conditions of the mined hybrid system representation and the set of extracted mode transition conditions of the extracted state machine representation.

20. The method of claim 16, further comprising:

identifying a conditional statement within the set of machine-readable instructions; and generating the conditional node of the one or more conditional nodes of the abstract syntax tree, the conditional node being descriptive of an extracted mode transition condition of the set of extracted mode transition conditions based on the conditional statement within the set of machine-readable instructions, the conditional node being associated with an input argument.

21. The method of claim 16, further comprising:

identifying a response function within the set of machine-readable instructions associated with a conditional statement; and generating the response function call node of the abstract syntax tree, the response function call node being descriptive of an extracted mode of the set of extracted modes based on the response function within the set of machine-readable instructions, the response function call node being dependent on an input argument associated with the conditional statement.

22. The method of claim 16, further comprising:

grouping one or more response function call nodes within each unique path of the plurality of paths of the abstract syntax tree into the set of extracted modes.

23. The method of claim 16, further comprising:

grouping one or more conditional nodes within each unique path of the plurality of paths of the abstract syntax tree into the set of extracted mode transition conditions.

24. The method of claim 16, further comprising:

receiving one or more input argument names that are used as input to the set of operational mode transition conditions of the system;

receiving one or more output variable names that are control outputs of the braking system; and receiving one or more response function names descriptive of one or more response functions according to the set of operational modes of the braking system.

25. The method of claim 24, further comprising:

clustering the set of input-output data using the one or more input argument names, the one or more output variable names and the one or more response function names;

inferring an estimated response function of the mined hybrid system representation associated with each estimated mode of the set of estimated modes based on the set of input-output data; and inferring the set of estimated mode transition conditions of the mined hybrid system representation using the set of input-output data, the one or more input argument names and the one or more output variable names.

* * * * *